Jan. 5, 1943.    R. H. GODDARD    2,307,125
LAUNCHING APPARATUS FOR ROCKET CRAFT
Filed Dec. 9, 1940    4 Sheets-Sheet 1
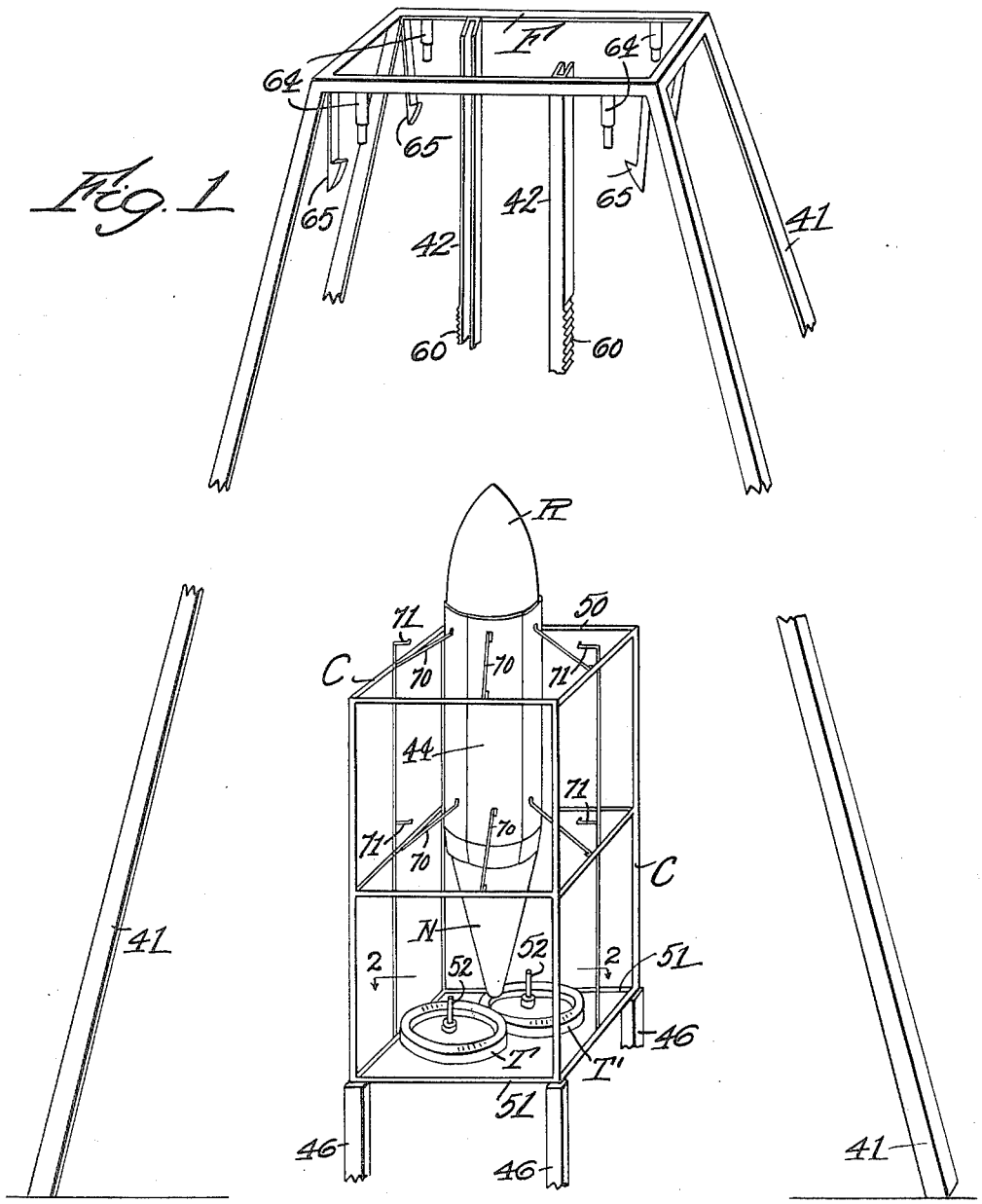

Jan. 5, 1943.  R. H. GODDARD  2,307,125
LAUNCHING APPARATUS FOR ROCKET CRAFT
Filed Dec. 9, 1940  4 Sheets-Sheet 2
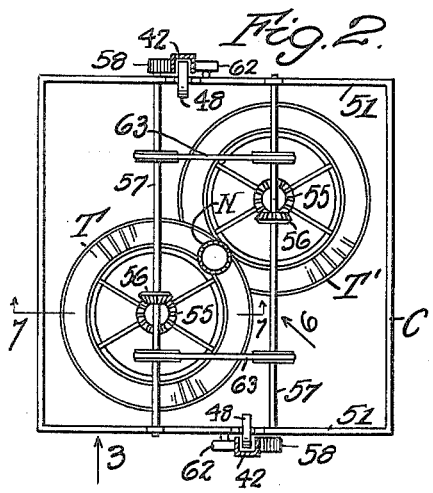
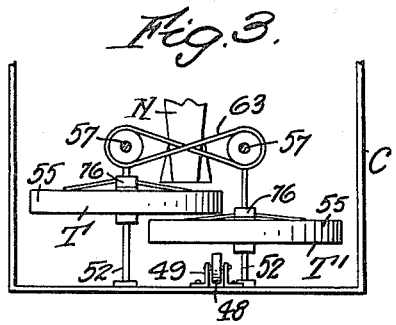
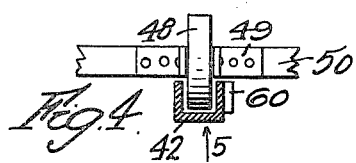
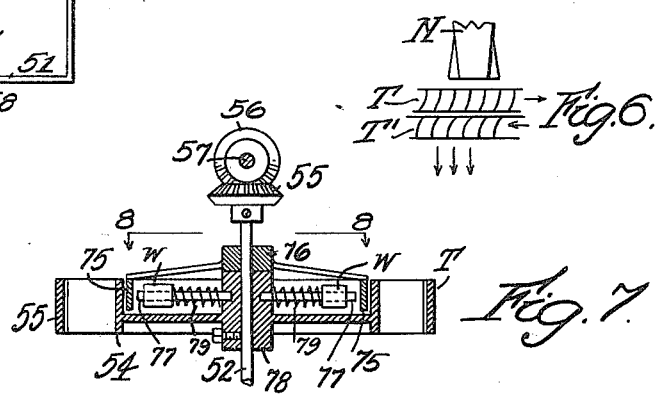
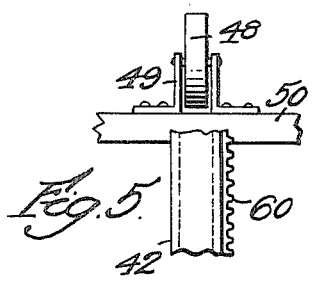
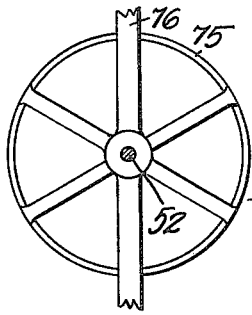
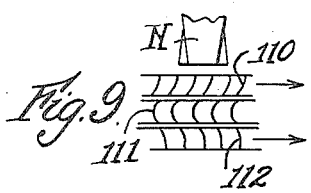
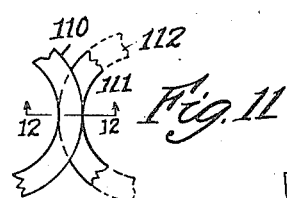
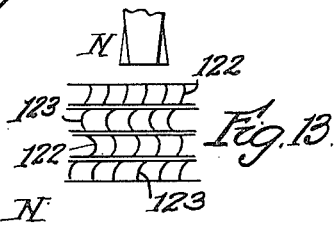
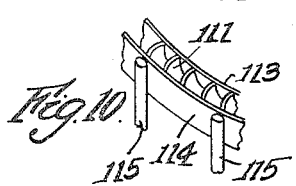
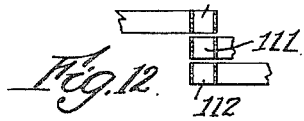
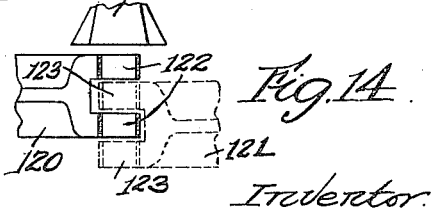
Inventor.
Robert H. Goddard

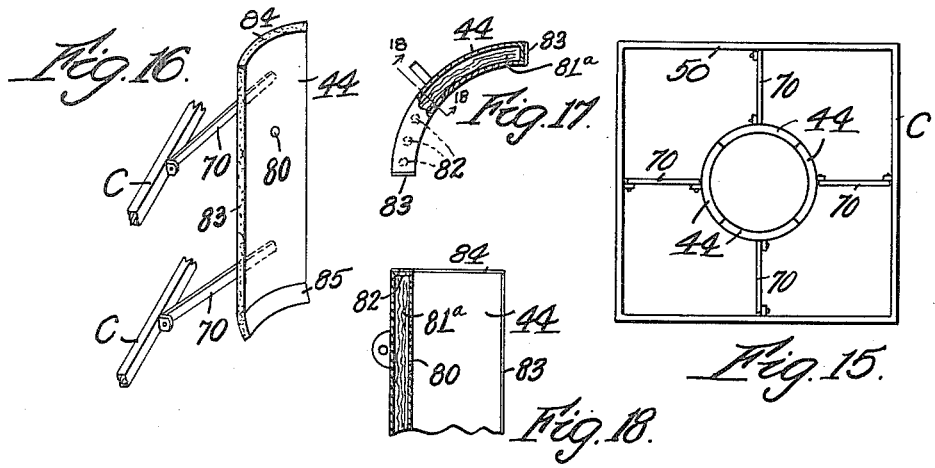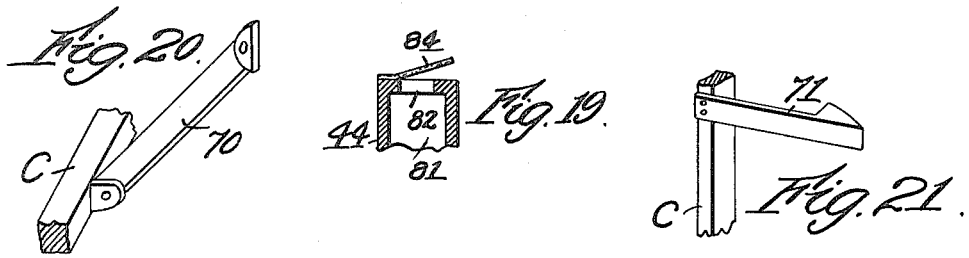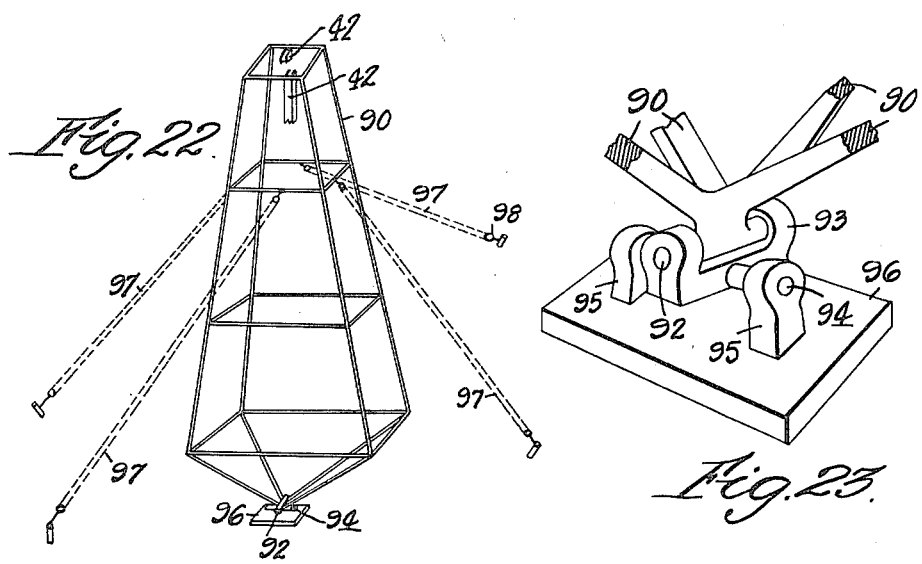

Jan. 5, 1943. R. H. GODDARD 2,307,125
LAUNCHING APPARATUS FOR ROCKET CRAFT
Filed Dec. 9, 1940 4 Sheets—Sheet 4
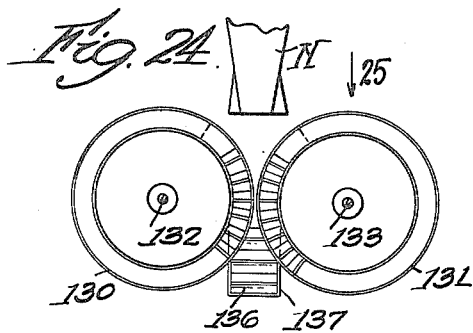
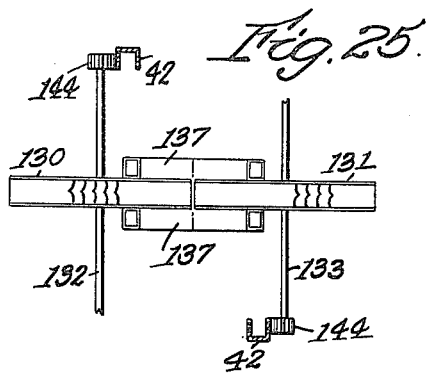
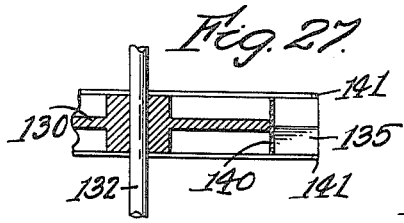
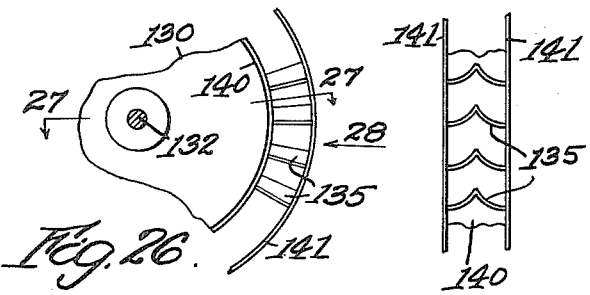
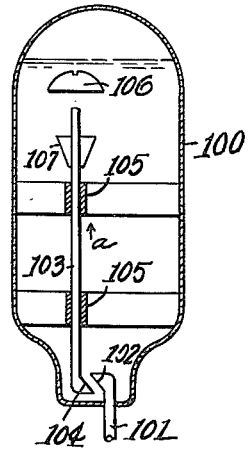
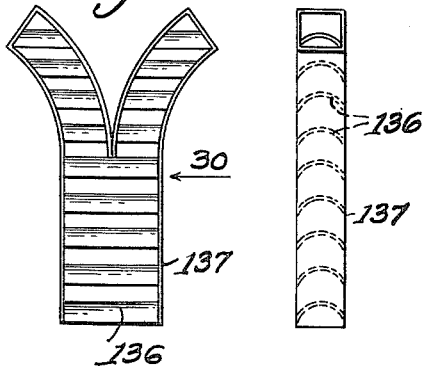
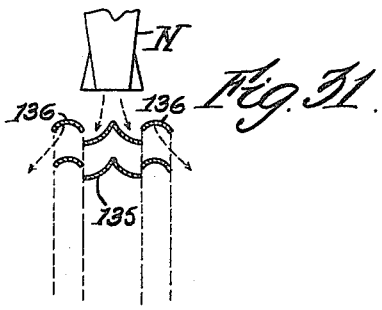
Inventor
Robert H. Goddard
By attorney
Chas. T. Hawley Patented Jan. 5, 1943

2,307,125

UNITED STATES PATENT OFFICE 2,307,125

LAUNCHING APPARATUS FOR ROCKET CRAFT

Robert H. Goddard, Roswell, N. Mex.

Application December 9, 1940, Serial No. 369,202

15 Claims. (Cl. 244—63)

This invention relates to rockets and rocket craft of the type which is propelled by a blast of combustion gases directed rearwardly through a discharge nozzle. Such a craft operates efficiently at high speed but is quite inefficient at low speed. The first part of a flight before normal speed is attained is very wasteful of fuel and the range of flight is thereby substantially reduced. Furthermore, wind drift and other undesirable effects are accentuated at low speed.

It is the general object of my present invention to provide improved apparatus by which a rocket craft may be launched at high speed and by which the undesirable attributes of slow speed operation may be avoided.

A further object of my invention is to provide launching apparatus which derives its power from the rocket blast itself. I also provide launching apparatus which is separable from the rocket craft and which is left behind as reasonable speed is attained.

My invention further relates to arrangements and combinations of parts which will be hereinafter set forth and more particularly pointed out in the appended claims.

Preferred forms of the invention are shown in the drawings, in which

Fig. 1 is a perspective view of my improved launching apparatus, with certain parts broken away;

Fig. 2 is a sectional plan view, taken substantially along the line 2—2 in Fig. 1;

Fig. 3 is a partial side elevation, looking in the direction of the arrow 3 in Fig. 2;

Fig. 4 is an enlarged sectional plan view of certain parts shown in Fig. 2;

Fig. 5 is a detail side elevation, looking in the direction of the arrow 5 in Fig. 4;

Fig. 6 is a detail view looking in the direction of the arrow 6 in Fig. 2 and with certain outer parts removed;

Fig. 7 is a sectional elevation, taken along the line 7—7 in Fig. 2;

Fig. 8 is a detail plan view of certain brake structure, taken along the line 8—8 in Fig. 7;

Fig. 9 is a view similar to Fig. 6 but showing a modified construction;

Fig. 10 is a fragmentary perspective view of certain fixed blade elements shown in Fig. 9;

Fig. 11 is a partial plan view of the turbine structure shown in Fig. 9;

Fig. 12 is a detail sectional view, taken along the line 12—12 in Fig. 11;

Fig. 13 is a view similar to Fig. 6 but showing an additional modification of the turbine structure;

Fig. 14 is a sectional side elevation of the structure shown in Fig. 13;

Fig. 15 is a plan view of the rocket-supporting cradle;

Fig. 16 is a perspective view of one of the rocket-supporting members;

Fig. 17 is a plan view, partly in section, of one of said members;

Fig. 18 is a partial sectional side elevation, taken along the line 18—18 in Fig. 17;

Fig. 19 is an enlarged detail sectional elevation to be described;

Fig. 20 is a perspective view of a supporting arm;

Fig. 21 is a perspective view of a latch or catch for said arm;

Fig. 22 is a perspective view of certain apparatus for varying the direction of flight;

Fig. 23 is an enlarged perspective view of a universal joint or bearing appearing in Fig. 22;

Fig. 24 is a partial side elevation of an additional turbine modification;

Fig. 25 is a plan view, looking in the direction of the arrow 25 in Fig. 24;

Fig. 26 is an enlarged side elevation of a part of one of the turbines shown in Fig. 24;

Fig. 27 is a detail sectional view, taken along the line 27—27 in Fig. 26;

Fig. 28 is a partial side view, looking in the direction of the arrow 28 in Fig. 26;

Fig. 29 is a front elevation of a fixed gas deflector shown in Figs. 24 and 25;

Fig. 30 is a side elevation thereof, looking in the direction of the arrow 30 in Fig. 29;

Fig. 31 is a sectional elevation, illustrating the gas travel in the construction shown in Fig. 24; and Fig. 32 is a sectional elevation of a safety device to be described.

Referring particularly to Figs. 1, 2 and 3, my improved launching apparatus comprises a fixed frame-work F having braced legs or supports 41 adapted to be firmly anchored to the ground or other supporting surface.

Guide-bars 42 of U-shaped section are fixed at their upper ends to the frame F and have their lower ends suitably secured or anchored. These bars 42 constitute vertical guides for a cage or cradle C in which a rocket or rocket craft R is held by segmental supporting members 44. The cradle C normally rests on fixed supports 46 within the frame F.

Guide-rolls 48 (Figs. 2 to 5) are mounted in brackets 49 which are fixed to the upper and lower cross members 50 and 51 of the cage or cradle C and coact with the upright fixed channeled guide-bars 42 to direct the cradle C in its upward movement.

The rocket craft R is provided with a rearwardly directed discharge nozzle N, and the combustion gases discharged rearward through the nozzle N coact with reaction turbines T and T' (Fig. 3) to furnish power to move the cradle C rapidly upward and thereby launch the rocket R. The turbines T and T' are mounted on vertical shafts 52 rotatable in bearings fixed in the cradle C, and the blades of the turbine T overlie the blades of the turbine T', as indicated in Fig. 6. Inner and outer shroud rings 54 and 55 (Fig. 7) are preferably provided for the blades of the turbines T and T'.

Combustion gases discharged at high speed through the nozzle N successively engage the blades in the upper turbine T and in the lower turbine T' and rotate these turbines rapidly in opposite directions, as indicated by the arrows in Fig. 6.

The upper turbine T deflects the gases horizontally and the lower turbine T' deflects the gases downward, so that the gases leaving the turbine T' have a propulsive effect, as well as producing rotation of the turbines. If the entrance angles of the two sets of blades are correctly related to the blade speed and to the rate of gas travel, the gas will enter and leave the turbine blades without shock.

The driving connections through which the turbines T and T' raise the cradle C are shown in detail in Figs. 2 and 3. Each turbine shaft 52 is provided with a bevel gear 55 (Figs. 2 and 7) which meshes with a corresponding gear 56 on a cross shaft 57 rotatable in bearings fixed in the cradle C. Each cross shaft is provided with a pinion 58 at one end thereof, which pinion meshes with a rack bar 60 (Fig. 5) formed on or secured to one of the fixed upright guides 42 but not extending the full height of the guides 42, as indicated in Fig. 1.

Additional guide rolls 62 (Fig. 2) are preferably provided on the cross members 50 and 51 of the cradle C to engage the opposite face of each guide-bar 42 and resist the transverse thrust of each pinion 58 against its rack bar 60. In order to prevent binding, the two horizontal shafts 57 are connected by crossed belts or chains 63 (Figs. 2 and 3), so that they must always rotate at the same speed.

The operation of the structure thus far described is quite simple. When combustion is started in the rocket craft R and combustion gases are discharged through the nozzle N, the turbines T and T' are immediately rotated at high speed but in opposite directions and the pinions 58 are correspondingly rotated through the driving connections above described.

As the rack-bars 60 are fixed, rotation of the pinions 58 causes the cradle C to be moved rapidly upward in its fixed tower or supporting frame F, and the rocket R is thus rapidly accelerated. During this upward movement, the cradle is guided by the guide-rolls 48 and 62 as previously described.

As the cradle approaches the upper end of its path of travel, the pinions 58 clear the rack bars 60 and the upper frame members 50 of the cradle C engage buffers or shock-absorbers 64 (Fig. 1) and are held from downward return movement by spring latches 65. After the rocket has cleared the cradle C and begun its flight, the cradle may be released and returned to initial position by any suitable manual or power-operated lowering means.

As the cradle C engages the buffers 64 (Fig. 1), the inertia of the rocket-supporting members 44 will cause them to swing upward and outward on their supporting arms 70 and these arms will be caught and held by spring latches 71 (Figs. 1 and 21), so that the members 44 cannot swing inward and again engage the rocket R as it leaves the cradle.

I find it essential to control the speed of the turbines T and T', particularly after the pinions 58 clear the rack-bars 60, and for this purpose I provide the braking structure shown in Figs. 7 and 8. A brake-band 75 for each turbine is supported on arms 76 (Fig. 8) which are fixed in the cradle C. Each brake-band 75 is positioned within the inner shroud 54 of its associated turbine, but with substantial clearance relative thereto.

Rods 77 (Fig. 7) are fixed in the tub 78 of the turbine T or T' and extend radially outward within the fixed brake-band 75. Weights W are slidable on the rods 77 and are yieldingly drawn toward the axis of the turbine by tension springs 79. As the speed increases, the weights W overcome the tension of the springs 79 and move outward to engage the internal surfaces of the associated brake-bands 75, thus controlling the speed of rotation of the turbines.

The rocket-supporting members 44 (Fig. 1) are of special construction, as shown in detail in Figs. 16 to 19. Each member 44 is of segmental shape and (as shown in the drawings) each segment covers one-fourth of the rocket surface.

Special provision is necessary to prevent these segmental members from being frozen tight to the surface of the rocket, which is commonly propelled by a mixture of gasoline and liquid oxygen and the latter liquid having a temperature of —300° F.

If any of the liquid oxygen vaporizes inside of the rocket casing, the casing will be so chilled that moisture in the surrounding atmosphere will be immediately condensed and might freeze the members 44 hard to the rocket casing.

To avoid such a result, the members 44 are made with hollow walls as shown in Figs. 17 and 18 and are each provided with an opening 80 which communicates with a corresponding opening in the rocket casing and through which dry oxygen gas is admitted to the segmental space 81 within each member 44. The space 81 is preferably filled with some material 81ª, such as aluminum foil, which will allow the gas to pass through freely but which is resistant to thermal radiation.

Additional openings 82 are provided along the side and end edges of each member 44, through which openings the dry oxygen gas escapes to the atmosphere, preferably through strips of felt 83 at the side edges of each member 44 and under the edge of a strip of felt 84 which is secured at its outer edge only to the top or bottom edge of its member 44, as shown in Fig. 19.

The gas is warmed by contact with the outer wall of the member 44 and the escape of warm dry oxygen gas in the manner described prevents condensation of moisture and freezing of the members 44 to the rocket casing. The lower end portion 85 of each member 44 is projected inward to form a supporting surface for the conical lower end of the rocket casing.

If it is desired to launch the rocket craft R in some other than a strictly vertical direction, the cradle C, guidebars 42 and supports 46 may be mounted in a frame-work 90 (Fig. 22) which is pivoted at its lower end on a cross shaft 92 in a swivel member 93. The member 93 is pivoted on a horizontal shaft 94 mounted in fixed bearings 95 on a base plate 96 and extending at right angles to the shaft 92. The parts thus described form a swivel bearing or universal support for the frame 90, which may be shifted in one plane about the axis of the shaft 94 or in a second plane perpendicular to the first plane about the axis of the shaft 92.

Any convenient means may be provided for shifting and rigidly holding the frame 90 in any desired position. In Fig. 22, a plurality of ropes 97 and tackle blocks 98 are indicated.

By this construction, the rocket craft may be launched at any desired angle, as the cradle and lifting mechanism will operate satisfactorily at any reasonable angle.

It may happen that the rocket craft will leave the launching apparatus at a higher speed than can be immediately maintained by the rocket blast, due to air resistance, in which case the rocket craft may decelerate, with a tendency for the liquid fuel and liquid oxygen in the supply tanks to shift forward, with corresponding movement of the vapors in the tanks to the rear or feeding ends thereof. In this case, gas instead of vapor will be fed to the combustion chamber, and the operation of the rocket blast will be impeded or interrupted.

To prevent such action, I provide the safety devices shown in Fig. 32, in which one of the supply tanks (for either fuel or liquid oxygen) is indicated at 100 and the feed pipe therefrom at 101. The upper end of the feed pipe is provided with an inclined open seat 102, and an adjacent pipe 103 is provided with a corresponding inclined open seat 104. The pipe 103 is slidable in bearings 105 in the tank 100 and normally occupies the position shown in Fig. 32.

If the craft is decelerated, however, the pipe 103 will shift forward as indicated by the arrow *a* in Fig. 32, thus engaging and externally closing the open seats 102 and 104, so that further feed to the pipe 101 must be through the open upper end of the pipe 103, which is at the forward end of the tank, to which end the liquid is being correspondingly shifted. Gas in the bottom of the tank 100 is thus excluded from the feed pipe 101, while liquid from the top of the tank may flow through the pipe 103 to the pipe 101. When the craft thereafter begins to accelerate, the pipe 103, which is held by small but definite friction, will automatically shift rearward, restoring the usual feed through the open seat 102 after the liquid has returned to the bottom of the tank.

A fixed shield 106 deflects gas which is moving downward, so that it will not enter the pipe 103. As the gas returns to the top of the tank on acceleration, a deflector 107 directs the rising gas away from the top of the pipe 103. The shield 106 and deflector 107 both have small bleed openings to permit gradual escape of gas or liquid.

In Figs. 9 to 12, 13 and 14, and 24 to 31, I have shown several modifications of the simple turbine structure shown in Figs. 3 and 6, which modifications possess certain individual advantages, as will now be described.

In Figs. 9 to 12, I have shown a set of moving blades 110, a set of fixed blades 111, and a second set of moving blades 112. The fixed blades 111 reverse the angle of gas travel, so that the two sets of moving blades 110 and 112 rotate in the same direction. This three-stage operation is more efficient than two-stage and this construction makes it possible to use open instead of crossed belts between the pinion shafts 57, which is of course a mechanical advantage. The fixed blades 111 cover a segment only and are provided with inner and outer shrouds 113 and 114 (Fig. 10), the latter being mounted on fixed supports 115.

The construction shown in Figs. 13 and 14 is similar to that shown in Fig. 6, with the exception that each turbine 120 or 121 is provided with two sets of turbine blades. The blades 122 of the turbine 120 alternate with the blades 123 of the turbine 121, so that a more efficient four-stage expansion is substituted for the simple two-stage operation of the turbine shown in Figs. 3 and 6. The turbines 120 and 121 will rotate in opposite directions as in Fig. 3 and crossed belts between the pinion shafts 57 will still be necessary.

In Figs. 24 to 31, I have shown a modified construction in which turbines 130 and 131 are mounted on parallel shafts 132 and 133 (Fig. 25) which extend crosswise of the supporting cradle and at right angles to the path of travel of the rocket blast. Each turbine is provided with double blades 135 (Figs. 28 and 31) by which the discharge gases are diverted sidewise into engagement with fixed blades 136 in deflecting devices 137, one of which is positioned at each side of the coacting turbines 130 and 131, which rotate in a single plane. The devices 137 redirect the gases downward to conserve lifting force.

Inner shrouds 140 only are provided in the turbines 130 and 131 but the outer edges of the blades 135 may be stiffened by encircling wire rings 141. The double blades 135 should be somewhat wider than the opening at the rear end of the nozzle N.

This construction has the advantage that the beveled gearing shown in Figs. 2 and 7 may be omitted and that pinions 144 may be mounted direct on the turbine shafts 132 and 133. These pinions coact with fixed rack-bars on the channeled upright guides 42, all as previously described. This form of turbine is somewhat less efficient than the forms previously described but has the advantage of simplifying the driving connections.

I have thus provided a launching apparatus for a rocket or rocket craft which is of simple and reliable construction and which is well adapted to its intended purposes. I have also provided launching apparatus operated from the rocket blast of the craft to be launched, thus avoiding the need of any auxiliary source of power and insuring that the combustion apparatus in the rocket craft will be in effective operation before free flight begins.

Having thus described my invention and the advantages thereof, I do not wish to be limited to the details herein disclosed, otherwise than as set forth in the claims, but what I claim is:

1. Launching apparatus for rocket craft having an outer casing which comprises a fixed frame, a cradle mounted for upward movement in said frame and supporting said rocket craft, means movably mounted on said cradle and engaging the sides of said rocket craft to laterally position said craft in said cradle, and power means to rapidly raise said cradle and rocket craft in said frame.

2. The combination in launching apparatus as set forth in claim 1, in which means is provided to stop said cradle at the top of the fixed frame, and in which the craft-positioning means moves outward by inertia to automatically release said rocket craft as said cradle is stopped.

3. The combination in launching apparatus as set forth in claim 1, in which means is provided to stop said cradle at the top of the fixed frame, in which the craft-positioning means moves outward by inertia to automatically release said rocket craft as said cradle is stopped, and in which means is provided to prevent return movement of said positioning means toward said rocket craft.

4. The combination in launching apparatus as set forth in claim 1, in which means is provided to stop said cradle at the top of the fixed frame, and in which the craft-positioning means comprises a plurality of segmental positioning members engaging said outer casing and upwardly inclined supporting arms for said members, said members being swung upward and outward on said supporting arms by inertia to release said craft as said cradle is stopped.

5. The combination in launching apparatus as set forth in claim 1, in which means is provided to stop said cradle at the top of the fixed frame, in which the craft-positioning means comprises a plurality of segmental supporting members engaging said outer casing and upwardly inclined supporting arms for said members, said members being swung upward and outward on said supporting arms by inertia to release said craft as said cradle is stopped, and in which yielding devices are provided to prevent rebound of said segmental members.

6. Launching apparatus for rocket craft normally propelled by a rocket blast comprising a fixed frame, a cradle mounted for upward movement in said frame, means to support said rocket craft in said cradle, mechanical means to rapidly raise said cradle and rocket craft in said frame, and power devices actuated by said rocket blast effective to drive said mechanical means.

7. Launching apparatus for rocket craft comprising a fixed frame, a cradle mounted for upward movement in said frame, means to support said rocket craft in said cradle, mechanical means to rapidly raise said cradle and rocket craft in said fixed frame, means to stop said cradle at the top of said frame, and devices to prevent return downward movement of said cradle.

8. Launching apparatus for rocket craft normally propelled by a rocket blast comprising a fixed frame, a cradle mounted for upward movement in said frame, means to support said rocket craft in said cradle, a pair of turbines mounted in said cradle and actuated by said rocket blast, and mechanical connections between said turbines and said frame through which said cradle and craft are abruptly raised when said rocket blast is put in operation.

9. The combination in a launching apparatus as set forth in claim 8, in which said mechanical connections include two rack bars fixed to said frame, and a pinion driven by each turbine and engaging one of said rack bars.

10. The combination in a launching apparatus as set forth in claim 8, in which said mechanical connections include two rack bars fixed to said frame, a pinion driven by each turbine and engaging one of said rack bars, and means to cause said two pinions to rotate at the same speed.

11. Launching apparatus for rocket craft normally propelled by a rocket blast comprising a fixed frame, a cradle mounted for upward movement in said frame, means to support said rocket craft in said cradle, a pair of turbines mounted in said cradle and actuated by said rocket blast, mechanical connections between said turbines and said frame through which said cradle and craft are abruptly raised when said rocket blast is put in operation, and means to render said mechanical connections inoperative as said craft reaches the top of said fixed frame.

12. Launching apparatus for rocket craft normally propelled by a rocket blast comprising a fixed frame, a cradle mounted for upward movement in said frame, means support said rocket craft in said cradle, a pair of turbines mounted in said cradle and actuated by said rocket blast, mechanical connections between said turbines and said frame through which said cradle and craft are abruptly raised when said rocket blast is put in operation, and braking means to automatically control and limit the speed of said turbines.

13. Launching apparatus for rocket craft normally propelled by a rocket blast comprising a fixed frame, a cradle mounted for upward movement in said frame, means to support said rocket craft in said cradle, and power means directly operated by said rocket blast but only while the rocket craft is in said cradle, said power means being effective to abruptly raise said craft and cradle in said frame, and said rocket blast thereafter propelling the rocket craft in free flight by rearward discharge therefrom.

14. Launching apparatus for rocket craft comprising a fixed frame, a cradle mounted for upward movement in said frame, means to support said rocket craft in said cradle, power means to rapidly raise said cradle and rocket craft in said frame, and means to prevent said craft supporting means from freezing to the rocket craft and casing.

15. Launching apparatus for rocket craft comprising a fixed frame, a cradle mounted for upward movement in said frame, means to support said rocket craft in said cradle, power means to rapidly raise said cradle and rocket craft in said frame, said craft-supporting means comprising hollow segmental members engaging the rocket craft casing, means to inject dry oxygen gas into said hollow members, and means to discharge said gas at the edges of said members.

ROBERT H. GODDARD.